United States Patent [19]
Cochran et al.

[11] Patent Number: 5,399,194
[45] Date of Patent: Mar. 21, 1995

[54] METHOD OF FLY ASH BENEFICIATION AND APPARATUS FOR SAME

[75] Inventors: Joe W. Cochran, Palm Harbor; S. Frank Kirkconnell, St. Petersburg, both of Fla.

[73] Assignee: Electric Power Research Institute, Palo Alto, Calif.

[21] Appl. No.: 200,413

[22] Filed: Feb. 23, 1994

[51] Int. Cl.$^6$ ............................................. C04B 18/06
[52] U.S. Cl. ............................ 106/405; 106/478; 106/DIG. 1
[58] Field of Search .............. 106/405, 478, DIG. 1; 264/DIG. 49; 502/39, 44

[56] References Cited

U.S. PATENT DOCUMENTS

| | | | |
|---|---|---|---|
| 3,328,180 | 6/1967 | Ban | 106/DIG. 1 |
| 3,979,168 | 9/1976 | Chauvin | 106/DIG. 1 |
| 4,043,831 | 8/1977 | Friedman | 106/DIG. 1 |
| 4,121,945 | 10/1978 | Hurst et al. | 106/DIG. 1 |
| 4,304,659 | 12/1981 | Pratt et al. | 502/44 |
| 4,325,833 | 4/1982 | Scott | 502/44 |
| 4,341,623 | 7/1982 | Bertolacini et al. | 502/44 |
| 4,705,409 | 11/1987 | Trence | 106/DIG. 1 |
| 4,843,981 | 7/1989 | Goldbach et al. | 110/347 |
| 4,959,334 | 9/1990 | Mauleon et al. | 502/39 |
| 5,160,539 | 11/1992 | Cochran | 106/405 |
| 5,190,451 | 3/1993 | Goldbach | 431/5 |
| 5,236,354 | 8/1993 | Goldbach | 431/5 |

FOREIGN PATENT DOCUMENTS 734162  5/1980  U.S.S.R. .

OTHER PUBLICATIONS

Holusha, John, "From the Ashes, a Plus for Utility", The New York Times, Nov. 24, 1993; p. C5.

*Primary Examiner*—Mark L. Bell
*Assistant Examiner*—Michael Marcheschi
*Attorney, Agent, or Firm*—Flehr, Hohbach, Test, Albritton & Herbert

[57] ABSTRACT

A method for beneficiating particles of fly ash containing carbon which includes the following steps. The particles of fly ash are introduced into a dry bubbling fluid bed and air is supplied thereto. The fluid bed is operated at a temperature ranging from approximately 800° to 1300° F., during which the air intimately mixes with the particles of fly ash and oxidizes the carbon therein. The beneficiated particles of fly ash are then removed from the fluid bed. The carbon reduction in the particles of fly ash permits these particles to be used as pozzolan to replace a portion of the cement in concrete. An apparatus is provided for performing the method of the invention.

9 Claims, 1 Drawing Sheet

METHOD OF FLY ASH BENEFICIATION AND APPARATUS FOR SAME

BRIEF DESCRIPTION OF THE INVENTION

This invention relates to beneficiation by oxidation of fine particles of carbonaceous fly ash and more particularly to beneficiation of fine particles of fly ash having low incipient agglomeration temperatures.

BACKGROUND OF THE INVENTION

Fly ash is a byproduct of coal fired power plants. Much fly ash has a carbon content which precludes any beneficial use thereof. Nonbeneficiated high carbon content fly ash must be disposed of at certain designated sites after obtaining the necessary permits. Processes are known in the art, however, for beneficiating fly ash particles by oxidizing carbon therein so as to reduce the carbon content to acceptable levels. See, for example, U.S. Pat. No. 5,160,539 filed Apr. 5, 1991 which discloses a method for reducing the carbon content in fly ash particles so as to permit the particles to be useful as pozzolan and replace a portion of the cement in concrete. That process, however, is limited to bed temperatures in excess of about 1300° F. and preferably between about 1500° and 1600° F.

There are several reasons for operating fluid beds in the 1500° F. range, including maintaining a large temperature differential for heat transfer and optimizing sulfur capture. Operation in such a range also stabilizes combustion by providing a substantial margin between the autoignition temperature of the fuel and the bed temperature. The autoignition temperature is the temperature at which the oxidation of the fuel accelerates greatly and is commonly thought of as the temperature at which the fuel begins to burn. Such a substantial margin is particularly desirable for fuels having a low volatile content.

Certain types of fly ash can not be beneficiated in the 1300° to 1500° F. temperature range disclosed in U.S. Pat. No. 5,160,539 because undesirable sintered agglomerates begin to form from the fly ash. The temperature at which this begins, often referred to as the incipient agglomeration temperature, is always lower than the initial deformation temperature for that fly ash and must be determined empirically for each fly ash feedstock. As can be appreciated by those skilled in the art, the initial deformation temperature of a fly ash is the temperature at which a specified amount of the fly ash first begins to melt under specified laboratory conditions. Fly ash from certain coal types, often referred to as low fusion fly ash, have chemical characteristics which can cause partial melting of the fly ash at relatively low temperatures. The low initial deformation temperature of these fly ashes can be deleterious to the beneficiation of the fly ash. Should such partial melting occur in a fluid bed of fine ash particles, for instance, agglomeration of the particles may result. These defluidized particles or agglomerates fall to the bottom of the bed, disrupt the uniform fluidizing air flow and cause a high temperature defluidized zone. This, in turn, causes further agglomeration in an expanding cycle. Because of the foregoing, fly ash having an incipient agglomeration temperature less than 1300° F. can not be processed by the method of U.S. Pat. No. 5,160,539.

In addition to the basic fusion characteristics of fly ash, the presence of alkali metals such as sodium can markedly reduce the incipient agglomeration temperature. For fly ash with low concentrations of alkali metals, the incipient agglomeration temperature in fluid beds is often 300° to 600° F. below the initial deformation temperature of the fly ash. Fly ash having an incipient agglomeration temperature of less than 1300° F., whether due to low initial deformation temperature or alkali metal content or other factors, can not be processed by the method of U.S. Pat. No. 5,160,539.

Autoignition of low volatile, low heat content carbonaceous fuels would not be expected below 1300° F. Fly ash has a very low volatile content and a very low heat content.

It has not previously been thought possible to operate a fly ash carbon burnout fluid bed combustor in a continuous mode at less than 1300° F. Laboratory tests were run in June 1989 using a modification of the Loss On Ignition (LOI) test (ASTM C-311 and C-114) to bracket potential operating ranges for development of the fly ash carbon burnout process described in U.S. Pat. No. 5,160,539. In these tests, essentially all carbon was consumed from a small sample of fly ash (perhaps 0.2 gram) at a temperature of 1382° F. in ambient air over a period of two hours. The tests showed that even with the extremely long residence time, and constant oxygen concentration, less than 60% of the carbon was consumed at 1000° F. and less than 1% at 500° F. Graphing this data gives a surprisingly linear relationship and seems to indicate that, even with excessively long residence times and high oxygen content, operation below 1300° F. would reduce less than 90% of the carbon content. An actual fly ash carbon burnout fluid bed would have much shorter residence times, on the order of 30 minutes, and reduced oxygen availability, about 5% $O_2$ by volume in exhaust gas. Therefore, poorer carbon reductions would be expected at bed temperatures similar to those discussed above.

Relevant literature provides several indirect indications that autoignition of the low BTU, low volatile fly ash "fuel" should not occur below 1300° F. For example, the 15th edition of the NFPA (National Fire Protection Association) Fire Protection Handbook on page 4–86 lists the following ignition temperatures in a turbulent cloud, which is similar to conditions in a fluid bed, for the low-volatile carbonaceous dusts specified below.

| Lamp Black | 1346° F. |
| Carbon Black, Acetylene | No Ignition |
| Carbon, Petroleum Coke and Pitch Electrodes | 1310° F. |
| Coal, Pennsylvania Anthracite | 1346° F. |
| Coke, Petroleum | 1238° F. |
| Graphite | No Ignition |

Fly ash is similar to these materials except that the carbon content is far lower, being a high fraction of inert materials, and the volatile content is substantially lower than both typical petroleum coke and Pennsylvania anthracite. The NFPA handbook on pages 4–92 and 4–93 indicates that while the very small particle size of the fly ash may tend toward a reduction in ignition temperature, both admixture of inert material and reduced oxygen content, which is typical during operation of a fly ash carbon burnout process, tend to raise the ignition temperature.

These tendencies are also noted in "Development and Control of Dust Explosions" by Nagy and Verakis. On page 48 of this book, a graph of ignition temperature versus volatile content is provided for a number of materials, including carbonaceous dust. As the volatile content of the carbonaceous dust approaches zero, the average ignition temperature shown is about 1450° F. This reference also includes a graph on Page 49 which shows the ignition temperature of mixtures of highly volatile Pittsburgh bituminous coal and inert Fuller's earth. While the ignition temperature of the coal alone is about 1100° F., the ignition temperature of a mixture of 80% inert material and 20% Pittsburgh coal is approximately 1325° F.

Some references, such as Catalytic Cracking Of Heavy Petroleum by Decroocq, note that catalytic cracker regenerators remove carbonaceous deposits from fine catalyst beads in fluid beds at temperatures in the 1100°–1175° F. range. However, other references, such as Petroleum Refinery Engineering by Nelson indicate that the carbonaceous deposits on the catalyst beads have a substantial volatile content which includes 7–15% hydrogen. As previously noted, these volatile hydrocarbons would be expected to very substantially lower the autoignition temperature of the material thus allowing combustion in the cited temperature range.

Fluid bed combustors designed to operate at temperatures less than 1300° F., and particularly less than 1050° F., require less exotic construction materials than combustors which operate at higher temperatures and, as a result, may be constructed more economically than high temperature combustors.

OBJECTS AND SUMMARY OF THE INVENTION

The primary object of the present invention is to provide a method and apparatus for beneficiating carbonaceous fly ash particles so that they can be used as a pozzolan to replace a portion of the cement in concrete.

A more particular object of the invention is to provide a method and apparatus of the above character for beneficiating carbonaceous fly ash particles having a low incipient agglomeration temperature.

Another object of the invention is to provide a method and apparatus of the above character in which the heat released in connection with the beneficiation of the carbonaceous fly ash particles is available for recovery and use.

Another object of the invention is to provide a method and apparatus of the above character in which the carbonaceous fly ash particles are beneficiated at temperatures less than 1300° F.

Another object of the invention is to provide a method and apparatus of the above character in which the carbonaceous fly ash particles are oxidized in a low temperature dry bubbling fluid bed of previously introduced fine particles of the same ash.

These and other objects are achieved by a method for beneficiating particles of fly ash containing carbon which includes the following steps. The particles of fly ash are introduced into a dry bubbling fluid bed and air is supplied thereto. The fluid bed is operated at a temperature ranging from approximately 800° to 1300° F., during which the air intimately mixes with the particles of fly ash and oxidizes the carbon therein. The beneficiated particles of fly ash are then removed from the fluid bed. The carbon reduction in the particles of fly ash permits these particles to be used as pozzolan to replace a portion of the cement in concrete. An apparatus is provided for performing the method of the invention.

Additional objects and features of the invention will appear from the following description from which the preferred embodiments are set forth in detail in conjunction with the accompanying drawings.

DETAILED DESCRIPTION OF THE INVENTION

Figure 1:
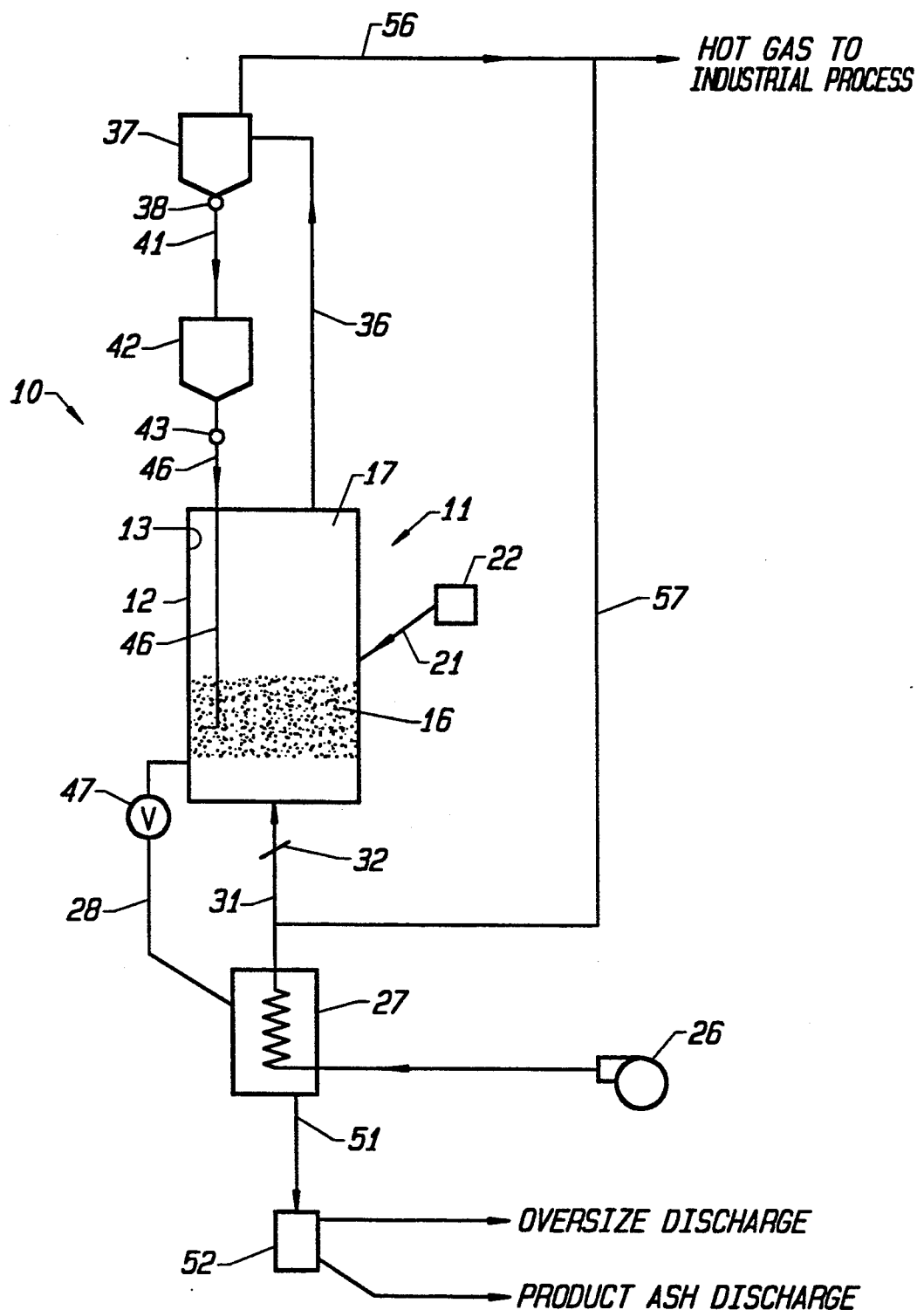
FIG. 1 is a schematic view of a fly ash beneficiation apparatus which utilizes the method of the present invention.

Reference will now be made in detail to the preferred embodiment of the invention which is illustrated in the accompanying figure. The description of the embodiment of the invention will be followed by a discussion of its operation.

Many of the components of the fly ash beneficiation apparatus of the present invention are described in detail in U.S. Pat. No. 5,160,539 filed Apr. 5, 1991 and that patent is incorporated by reference herein. In general, fly ash beneficiation apparatus 10 includes a fluidized bed reactor 11 formed from a vessel or container 12 having a chamber 13 therein. A dry bubbling fluid bed 16 consisting essentially of fine particles of fly ash of the type to be oxidized is provided in chamber 13 and a freeboard area 17 is located over the fluid bed.

The fine particles of fly ash are introduced into chamber 13 through line 21 by means of fly ash injector 22 which is capable of regulating the flow of fly ash particles into the chamber and can be of any suitable type such as a rotary feeder.

Means for supplying ambient air into the bottom of chamber 13 includes a forced draft fan 26. The ambient air from fan 26 is fed into a heat exchanging means or air preheater 27 wherein the air is preheated by the outflow of beneficiated fly ash flowing from container 12 through outflow line 28 into the air preheater. The heated air proceeds from preheater 27 through line 31 to fluid bed 16 within container 12. Forced draft fan 26 includes inlet dampers (not shown) for controlling the temperature of the air supplied into container 12. A combustion control damper 32 is provided on line 31 for serving as means for controlling the flow rate of the heated air entering the chamber and a mass flow meter (not shown) is provided for measuring this flow rate. The forced air so supplied into chamber 13 serves to fluidize and circulate the particles of fly ash therein as the particles travel through the fluidized bed reactor 11.

Means is provided for circulating the combustion exhaust gases and relatively lighter fly ash material within freeboard area 17 of container 12 and includes an exit or vent line 36 which carries these gases and material from the container to a suitable dust collection apparatus such as electrostatic precipitator 37. The fly ash material or dust is collected by the electrostatic precipitator and fed by gravity through discharge airlocks 38 into line 41 and then into a recycle ash surge bin 42. A rotary feed 43 causes the fly ash dust within bin 42 to be gravity fed through return line 46 into container 12 and is included within the means for maintaining the desired operating temperature within the fluidized bed reactor 11.

Outflow line 28 is included within the means for removing the beneficiated particles of fly ash from chamber 13. A valve 47 or any other suitable flow control device is provided in line 28 for adjusting the rate of flow through line 28. Valve 47 can also be utilized for temporarily increasing or decreasing flow so as to increase or decrease the level of fluid bed 16 and the residence time of the particles therein. In this manner, valve 47 is also included within the means of apparatus 10 for controlling the residence time of the fly ash particles within fluidized bed reactor 11.

The beneficiated fly ash cooled by air preheater 27 is fed therefrom by any suitable means such as a rotary feeder (not shown) through line 51 to a particle size classifier 52 which serves to separate any oversized ash or other material from the product ash. The oversized material and the product ash are then respectively discharged.

Excess heat is removed from chamber 13 for recovery and reuse in any suitable discrete industrial process such as serving as hot inlet gases to a power plant. In this regard, line 56 is included within the means to draw the cleaned exhaust gas, carrying its recovered heat, from electrostatic precipitator 37. Other heat can be withdrawn from hot air exiting air preheater 27 and directed by hot gas duct 57 for such other use.

In the operation of the method and apparatus of the present invention, fine particles of carbonaceous low fusion fly ash having low incipient agglomeration temperatures are beneficiated through carbon burnout. The incipient agglomeration temperatures of the fly ash can be significantly below 1300° F. and be the result of low initial deformation temperatures, elevated alkali metal concentrations and/or other factors. The low incipient agglomeration temperatures of these fly ash types preclude their beneficiation by processes heretofore provided. The fly ash particles, which have an autoignition temperature below 1300° F., are introduced into fluid bed 16 within chamber 13 by fly ash injector 22. Forced air preheated by air preheater 27 is simultaneously supplied into the bottom of the chamber by forced draft fan 26 and causes fluidization and circulation of the fly ash particles therein. Fan 26 permits the air to be supplied into chamber 13 at a volume ratio of air to particles of fly ash between about 1000:1 to 1400:1 and at a velocity of at least about 0.5 feet per second, but less than 3.0 feet per second.

As the particles of fly ash travel through fluid bed 16 within the operative temperature range, they intimately mix with the heated air being forced up through the particles and the oxygen within the air chemically reacts with the particles to oxidize the carbon therein and thereby reduce the carbon content of the particles. Container 12 is sized and the level of fluid bed 16 therein controlled so that the fly ash particles have a residence time in the bed of at least about two minutes and up to about 100 minutes.

The hot gases and fly ash material rise within chamber 13 and circulate from freeboard area 17 through vent line 36, electrostatic precipitator 37 and recycle ash surge bin 42. The electrostatic precipitator separates any particles of fly ash, which are typically of a dust-like character, from these hot gases and deposits them into bin 42. The outflow of fly ash particles from bin 42 reenters chamber 13 through return line 46. The rate and amount of fly ash particles so recycled into fluidized bed reactor 11 is determined by rotary feeder 43.

The operating temperature of fluidized bed reactor 11 is controlled and maintained in part by the amount of fly ash recycled into the reactor by rotary feeder 43. In the process and apparatus of the present invention, fluid bed 16 is operated at a temperature of not more than 1300° F. and preferably between about 800° and about 1300° F. When possible, the fluid bed is operated at a temperature less than 1050° so that container 12 can be constructed of less exotic construction materials. Most preferably, however, the bed temperature is the highest temperature within the 800° to 1300° F. range which is below the incipient agglomeration temperature of the fly ash being beneficiated, that is the highest temperature at which the process of the invention can continuously operate without forming undesirable sintered agglomerates in fluid bed 16. It is preferred that the oxidation within the fluidized bed reactor use excess oxygen of between about five and about 15%.

The beneficiated fly ash particles exit fluid bed 16 through outflow line 28 where they are cooled by air preheater 27 and segregated by particle size classifier 52. The product ash beneficiated by the method and apparatus of the present invention is discharged from apparatus 10 and has a sufficiently low carbon content so as to permit it being used, without further processing, as a replacement for a portion of the cement in concrete. The beneficiated product ash has a carbon content of less than approximately 6% and preferably less than 2%.

The exhaust gases generated within fluidized bed reactor 11 and cleaned by electrostatic precipitator 37 carry heat which can be recovered for any suitable use such as power generation. In this manner, the energy otherwise wasted as unburned carbon in fly ash is made available. Additional heat is available from air preheater 27 for this purpose.

The empirical data set forth in the following table was collected from tests utilizing the method of the present invention.

| FLUID BED CARBON BURNOUT TEST SUMMARY | | | | |
|---|---|---|---|---|
| | Bed | APPROX. LOI | | |
| Date | Temp. (degree F.) | Feed (%) | Product (%) | Ash Source |
| 9-30-92 | 975 | 9.2 | 6.3 | Tampa Electric Co. |
| 10-01-92 | 1000 | 9.2 | 6.3 | Tampa Electric Co. |
| 10-02-92 | 1100 | 9.2 | 4.8 | Tampa Electric Co. |
| 10-14-92 | 1025 | 16.0 | 5.0 | Gainesville Regional Utility |
| 10-26-92 | 1225 | 5.0 | 1.1 | Container Corp. |
| 10-26-92 | 1275 | 5.0 | 0.8 | Container Corp. |
| 11-04-92 to 11-06-92 | 1275 | 15.6 | 0.5 | Gainesville Regional Utility |
| 11-11-92 | 1275 | 15.2 | 0.6 | Gainesville Regional Utility |
| 11-19-92 | 1290 | 5.9 | 0.9 | Gulf Power Co. |
| 11-23-92 to 11-25-92 | 1275 | 8.3 | 2.0 | Gulf Power Co. |
| 7/08/93 to 7/10/93 | 1175 | 14.5 | 3.0 | Niagara Mohawk Power Company |

The term "LOI" in the table refers to loss on ignition. "Feed" refers to a particle of fly ash produced as a byproduct from a coal fired plant, and the corresponding "Product" refers to the Feed particle processed in accordance with the present invention. The percentages are the amount of weight lost on ignition in a laboratory test for a particle of Feed or Product. Since the percentage of weight loss is approximately equal to the amount of carbon present in the particle prior to laboratory testing, the percentage figure for Product is approximately equal to the percentage of carbon remaining in a particle of fly ash processed in accordance with the invention. Comparison of the percentage figures for Feed and Product from a given test shows the percentage of carbon oxidized by the process of the present invention in that test.

As can be seen from the foregoing, a method and apparatus have been provided for beneficiating carbonaceous fly ash particles so that they can be used as a pozzolan to replace a portion of the cement in concrete. The method and apparatus permits the beneficiation of carbonaceous fly ash particles having a low incipient agglomeration temperature due to a low initial deformation temperature, elevated alkali metal concentrations or other factors. In this method and apparatus, the heat released in connection with the beneficiation is available for recovery and use and the carbonaceous fly ash particles are beneficiated at temperatures less than 1300° F. In the beneficiation process and apparatus, the carbonaceous fly ash particles are oxidized in a low temperature dry bubbling fluid bed of previously introduced fine particles of the same ash.

What is claimed is:

1. A method for beneficiating particles of fly ash containing carbon comprising the steps of introducing the particles of fly ash into a dry bubbling fluid bed, supplying air to the fluid bed, operating the fluid bed at a temperature ranging from approximately 800° to 1275° F. to oxidize carbon in the particles of fly ash and reduce the carbon content of the particles of fly ash to a level less than approximately 6%, and removing the particles of fly ash from the fluid bed, the reduction in carbon in the particles of fly ash producing particles of fly ash which can be used as pozzolan to replace a portion of the cement in concrete and the operation of the fluid bed at a temperature ranging from approximately 800° to 1275° F. inhibiting the formation of sintered agglomerates.

2. The method of claim 1 wherein said introduction step includes selecting particles of fly ash having an autoignition temperature below 1300° F.

3. The method of claim 1 wherein said supplying step includes the step of supplying air to the fluid bed at a volume ratio of air to particles of fly ash ranging from approximately 1000:1 to 1400:1.

4. The method of claim 1 wherein said supplying step includes the step of supplying air to the fluid bed at a velocity ranging from approximately 0.5 to 3.0 feet per second.

5. The method of claim 1 wherein said operating step includes the step of retaining the particles of fly ash in the fluid bed for a residence time ranging from approximately two to 100 minutes.

6. The method of claim 1 wherein said operating step includes the step of operating the fluid bed at a temperature ranging from approximately 800° to 1050° F.

7. The method of claim 1 further comprising the step of removing excess heat from the fluid bed for recovery and reuse.

8. A method for beneficiating carbonaceous particles of fly ash comprising the steps of mixing particles of fly ash with air in a dry bubbling fluid bed, maintaining the fluid bed at a temperature ranging from approximately 800° to 1050° F., retaining the particles of fly ash in the fluid bed for a residence time ranging from approximately two to 100 minutes, the interaction of the particles of fly ash with the air in the fluid bed causing oxidization of carbon in the particles of fly ash and reduction of the carbon content of the particles of fly ash to a level less than approximately 6%, and removing the particles of fly ash from the fluid bed, the reduction in carbon in the particles of fly ash permitting the particles of fly ash to be useful as a pozzolan to replace a portion of the cement in concrete, the maintenance of the fluid bed at a temperature ranging from approximately 800° to 1050° F. inhibiting the formation of sintered agglomerates.

9. The method of claim 8 wherein the mixing step includes the step of supplying air into the fluid bed at a volume ratio of air to particles of fly ash ranging from approximately 1000:1 to 1400:1 and at a velocity ranging from approximately 0.5 to 3.0 feet per second.

* * * * *